United States Patent
Simard et al.

(10) Patent No.: US 9,033,700 B2
(45) Date of Patent: May 19, 2015

(54) APPARATUS AND METHOD FOR CLEANING REGENERATIVE-BURNER MEDIA BED

(75) Inventors: Claude Simard, Jonquière (CA); Stéphane Ménard, Canton-Tremblay (CA); Wesley Donald Stevens, Amherstview (CA); Edward J. Wilson, Richmond, KY (US); Paul Banks, Richmond, KY (US); Luc Belley, Jonquière (CA); Brad D. Burridge, Bowling Green, KY (US); Tony I. Phelps, Bowling Green, KY (US)

(73) Assignee: Novelis Inc., Atlanta, GA (US)

( * ) Notice: Subject to any disclaimer, the term of this patent is extended or adjusted under 35 U.S.C. 154(b) by 1368 days.

(21) Appl. No.: 11/259,617

(22) Filed: Oct. 25, 2005

(65) Prior Publication Data

US 2006/0093978 A1    May 4, 2006

Related U.S. Application Data

(60) Provisional application No. 60/625,521, filed on Nov. 4, 2004.

(51) Int. Cl.
*F23D 11/44* (2006.01)
*F27B 3/26* (2006.01)
(Continued)

(52) U.S. Cl.
CPC . *F27B 3/263* (2013.01); *F23J 3/00* (2013.01); *F23L 15/02* (2013.01); *F23L 2900/15022* (2013.01); *F27D 17/00* (2013.01)

(58) Field of Classification Search
USPC ............... 431/215, 161, 11; 165/4, 10
See application file for complete search history.

(56) References Cited

U.S. PATENT DOCUMENTS

| 400,072 A | 3/1889 | Fullford et al. |
| 3,418,680 A * | 12/1968 | Rausch ............ 15/317 |

(Continued)

FOREIGN PATENT DOCUMENTS

| CN | 2371455 Y | 3/2000 |
| CN | 2152196 Y | 1/2004 |

(Continued)

OTHER PUBLICATIONS

PROQUEST NPL search by STIC.*

(Continued)

*Primary Examiner* — Gregory Huson
*Assistant Examiner* — Nikhil Mashruwala
(74) *Attorney, Agent, or Firm* — Kilpatrick Townsend & Stockton LLP (57) ABSTRACT

A regenerative burner device for a furnace and a method of removing contaminants from such a device. The burner device includes a burner for introducing heat and waste gas into a furnace during ignition when supplied with fuel and a combustion gas, a media bed comprising refractory particles, and ducting for delivering combustion gas to said burner during ignition, and for drawing waste gas from said furnace on termination of ignition. The ducting causes the combustion gas and the waste gas to pass in succession through the media bed. Means are provided for periodically delivering a rapid flow of a decontaminating gas into said media bed. The rapid flow is of sufficient force to dislodge contaminants collected in the media bed from said waste gas.

17 Claims, 4 Drawing Sheets

(51) Int. Cl.
*F23J 3/00* (2006.01)
*F23L 15/02* (2006.01)
*F27D 17/00* (2006.01)

(56) References Cited

U.S. PATENT DOCUMENTS

| | | | | |
|---|---|---|---|---|
| 4,085,438 | A | * | 4/1978 | Butler ............................ 700/278 |
| 4,366,003 | A | * | 12/1982 | Korte et al. ....................... 134/18 |
| 4,646,871 | A | * | 3/1987 | Wolf ............................. 181/106 |
| 4,807,695 | A | | 2/1989 | Ward ................................ 165/4 |
| 4,828,483 | A | | 5/1989 | Finke |
| 4,829,703 | A | | 5/1989 | Watson et al. |
| 4,838,782 | A | | 6/1989 | Wills |
| 4,898,530 | A | | 2/1990 | Wills et al. |
| 4,923,391 | A | | 5/1990 | Gitman ............................ 431/10 |
| 4,942,832 | A | | 7/1990 | Finke |
| 4,944,670 | A | | 7/1990 | Watson ........................... 431/166 |
| 5,098,286 | A | * | 3/1992 | York ............................. 432/181 |
| 5,147,201 | A | | 9/1992 | Xiong |
| 5,161,968 | A | | 11/1992 | Nutcher et al. |
| 5,163,829 | A | | 11/1992 | Wildenberg |
| 5,304,059 | A | | 4/1994 | Tanaka et al. |
| 5,352,115 | A | | 10/1994 | Klobucar |
| 5,431,147 | A | | 7/1995 | Tanaka et al. |
| 5,460,789 | A | | 10/1995 | Wilhelm |
| 5,494,004 | A | * | 2/1996 | Hunter, Jr. .................... 122/395 |
| 5,517,950 | A | * | 5/1996 | Kendrick ....................... 122/390 |
| 5,562,442 | A | * | 10/1996 | Wilhelm .......................... 432/72 |
| 5,567,327 | A | * | 10/1996 | De Haan et al. ............... 210/768 |
| 5,619,771 | A | * | 4/1997 | Minic ........................... 15/316.1 |
| 5,755,569 | A | | 5/1998 | Berg et al. |
| 5,834,710 | A | * | 11/1998 | Finnestad ..................... 181/106 |
| 5,837,205 | A | | 11/1998 | Bayer et al. |
| 5,873,142 | A | | 2/1999 | Theiss ........................... 15/316.1 |
| 5,921,771 | A | | 7/1999 | Kobayashi |
| 6,065,528 | A | * | 5/2000 | Fierle et al. ........................ 165/5 |
| 6,109,914 | A | | 8/2000 | Matsuo |
| 6,450,800 | B1 | | 9/2002 | Cash |
| 6,471,508 | B1 | | 10/2002 | Finke et al. |
| 2002/0072020 | A1 | * | 6/2002 | Crane et al. ..................... 431/11 |
| 2002/0150515 | A1 | | 10/2002 | Pack |
| 2003/0015151 | A1 | * | 1/2003 | Hipple ........................... 122/379 |
| 2004/0123880 | A1 | | 7/2004 | Chiles et al. |
| 2005/0118084 | A1 | * | 6/2005 | Cichanowicz ............. 423/239.1 |
| 2012/0164588 | A1 | * | 6/2012 | Rauch ............................. 431/11 |

FOREIGN PATENT DOCUMENTS

| | | | |
|---|---|---|---|
| DE | 9418733 | 1/1995 | |
| DE | 4420131 | 12/1995 | |
| DE | 4420140 | 3/2001 | |
| EP | 588079 | 3/1994 | |
| GB | 2 192 264 | 1/1988 | ............. F28D 17/00 |
| GB | 2206403 | 1/1989 | |
| GB | 2 209 386 | 5/1989 | ............. F28D 17/00 |
| GB | 2227304 | 7/1990 | |
| JP | 8-68530 A | 3/1996 | |
| JP | H0868530 A | 3/1996 | |
| JP | 10170160 | 6/1998 | |
| JP | 10197159 | 7/1998 | |
| JP | 11201427 | 7/1999 | |
| JP | 2001021140 A | 1/2001 | |
| JP | 2001-241646 A | 9/2001 | |
| JP | 2001241646 A | 9/2001 | |
| JP | 2003-506664 A | 2/2003 | |
| JP | 2003506664 A | 2/2003 | |
| WO | 8703080 | 5/1987 | |
| WO | 9523916 | 9/1995 | |
| WO | 0111304 A1 | 2/2001 | |

OTHER PUBLICATIONS

Global Manufacturing, Inc. sales brochure "Air Blaster" (2002).
European Search Report dated Aug. 12, 2013 in EP 05802170.0-1605/1812752.
European Patent Application No. 05802170.0, Office Action mailed Dec. 12, 2013, 7 pages.
State Intellectual Property Office, P.R. China, Office Action (Dec. 26, 2008) in Chinese Patent Appl'n. No. 200580037886.6 (translation only).
English translation of Chinese patent application publication No. CN2371455 Y (Mar. 29, 2000).
EP Patent Application No. 05 802 170.0, Communication Pursuant to Rule 94(3) EPC, mailed Nov. 25, 2014 (7 pages).
Chinese Patent Application No. 200580037886.6, First Office Action mailed Dec. 26, 2008, 13 pages.
Chinese Patent Application No. 200580037886.6, Second Office Action mailed Jun. 5, 2009, 13 pages.
Chinese Patent Application No. 200580037886.6, Third Office Action mailed Feb. 5, 2010, 14 pages.
Chinese Patent Application No. 200580037886.6, Fourth Office Action mailed Aug. 4, 2010, 6 pages.
Mexican Patent Application No. MX/a/2007005298, Office Action mailed Oct. 26, 2010, 4 pages.
Mexican Patent Application No. MX/a/2007005298, Office Action mailed Feb. 4, 2011, 5 pages.
Japanese Patent Application No. 2007-538223, Office Action mailed Apr. 12, 2011, 8 pages.
Mexican Patent Application No. MX/a/2007005298, Office Action mailed Aug. 11, 2011, 7 pages.
Korean Patent Application No. 7012421/2007, Notice of Preliminary Rejection mailed Jun. 13, 2012, 6 pages.

* cited by examiner

APPARATUS AND METHOD FOR CLEANING REGENERATIVE-BURNER MEDIA BED

CROSS-REFERENCE TO RELATED APPLICATION

This application claims the priority of our prior provisional patent application Ser. No. 60/625,521, filed Nov. 4, 2004 (pending).

BACKGROUND OF THE INVENTION

1. Field of the Invention

This invention relates to regenerative burners used for heating furnaces intended for melting metals, such as scrap aluminum, glass and other materials. More particularly, the invention relates to media beds used for such burners and to ways of maintaining maximum airflow through such media beds.

2. Background Art

Regenerative burners, which have been used for heating furnaces for many years, are designed to improve fuel efficiency because they recycle heat that would otherwise go to waste. Usually, two fuel burners are used in tandem and are associated with two regenerative media beds. Each media bed is made up of heat-resistant particles that can absorb heat from, or deliver heat to, a gas passing through the bed depending on the relative temperatures of the gas and the bed at the time. The burners produce heat by burning a fuel in a combustion gas (normally air), thereby generating a hot gas that is directed into the furnace and is eventually withdrawn from the furnace as a hot waste gas. As a first of the two burners is operated, the waste gas that it generates is withdrawn from the furnace and passed through a second one of the media beds to heat the media. Combustion gas for the first burner is drawn through a first media bed where it is heated by media already hot from a prior burner cycle. After a period of time intended to maximize efficiency (often 30 seconds to three minutes), the first burner is turned off and the second burner is ignited. Combustion gas for the second burner is drawn through the second media bed (the one previously heated by the waste gas from the first burner), and waste gas from the second burner is withdrawn from the furnace and passed through the first media bed so that it is heated once again. By cycling the burners in this way, waste heat is captured to a large degree and is redirected back into the furnace so that the furnace is operated with improved efficiency. Clearly, it is possible to use more than two burners per furnace provided the waste gases from one group of burners are used to pre-heat the combustion gases from another other group by means of associated regenerative media beds.

A disadvantage of regenerative burners used in this way is that their associated media beds normally become contaminated by components of the waste gases taken from the furnace and passed through the beds. The nature of the contaminants depends on the material being heated in the furnace. For example, when the furnace is used for remelting scrap aluminum, the contaminants may be salt fluxes. The contamination takes the form of deposits of solids or sometimes liquids that accumulate in the bed and eventually reduce the flow of gas through the bed. These contaminants are usually in gaseous or liquid form in the hot waste gases, but they condense as the gas cools in the regenerative media bed. In other cases, the contaminants may be in the form of dusts or other solids that are present in the waste gases and become trapped in the media of the bed. Over time, the contaminants form a blockage that is difficult to remove. This problem is well recognized in the prior art, and many attempts have been made to solve the problem by removing the contaminating deposits in one way or anther.

United States published patent application No. 2002-0072020 (to Crane et al., published on Jun. 13, 2002) discloses a typical burner/media bed combination of the type used in metal melting furnaces. The publication discloses a convenient way for replacing an entire media bed when it has become contaminated to an unacceptable extent. The media bed thus removed is replaced with minimal delay by a spare media bed that contains new, renovated or otherwise treated media.

U.S. Pat. No. 4,944,670 (to Watson, issued on Jul. 31, 1990) discloses a two-burner furnace with regeneration beds that may be used in an aluminum melting facility. The patent notes that the beds become contaminated with salts, etc., and discloses a control system that periodically allows the beds to be headed to an elevated temperature to melt the adsorbed salts which can then be collected and discarded.

U.S. Pat. No. 4,807,695 (to Ward, issued on Feb. 28, 1989) discloses a design of regenerator for use in a regenerative burner system for melting glass or non-ferrous metals. The invention provides an inlet for adding clean refractory balls (the media particles of the bed) at one end of the bed, and means for removing contaminated balls at the other end. In this way, contaminants are removed as the bed is refreshed.

U.S. Pat. No. 4,923,391 (to Gitman, issued on May 8, 1990) discloses a regenerative burner control system for aluminum melting in which provision can be made for bypassing the regenerative bed at certain stages of the heating cycle when contaminants are particularly high. Contamination of the bed can therefore be reduced.

British patent application GB 2 209 386 A (to Wills, et al., published on May 10, 1989) discloses a regenerative burner system for glass melting where provision is made for use of an intermediate cooling stage (between two regenerative beds) so that contaminants can be condensed in a duct section that is easy to clean.

British patent application GB 2 192 264 A (to Goodfellow, published on Jan. 6, 1988) discloses a regenerative burner system in which a regenerative bed is arranged in two parts in such a manner that the gas passes downwardly through the first part and then upwardly through the second part. The temperature profile is arranged so that the contaminated zone is positioned close to the lowermost layer of the first part of the bed, whereupon relatively small changes in the temperature profile result in movement of the blocking material from the first part of the bed in a molten state. The contaminants are collected and discarded.

While these solutions to the problem may be effective in some ways, they nevertheless have disadvantages, such as requiring expensive modification of the apparatus or frequent replacement of the media. There is therefore a need for other ways of dealing with contamination of the media that reduces gas flow through regenerative beds.

SUMMARY OF THE INVENTION

The present invention, at least in one exemplary form, employs a rapid flow of gas operating over a short time period to dislodge contaminants from a regenerative media bed used with regenerative burners for furnaces of various types, particularly those used for the remelting of aluminum and aluminum alloys.

The rapid flow of gas over a short time period may be referred to as a gas "pulse", and it should produce sufficient force and be of sufficient volume to cause dislodgement of the contaminants from the bed. In one form of the invention, the pulse causes relative movement of the particles within the bed and the plug of contaminants is broken up or dislodged from the particles and carried away by the pulse of gas and/or by gravity, leaving the bed with improved porosity for good gas flow during subsequent regenerative cycles. The contaminant is converted to a powder that is either blown back through the media to the furnace, or passes through the media to a collection section of the apparatus. Most preferably, the pulse of gas is delivered in such a way that force is distributed substantially uniformly over the entire bed, or a predefined area of the bed, so that the dislodgement of contaminants is widespread rather than confined to a small region of the bed.

In some embodiments, although other arrangements are possible, the bed is supported on a horizontal porous plate (e.g. a punched hole plate or an expanded metal plate) above a plenum, and the pulse of gas is delivered from the plenum into the bed through the porous plate. Most preferably, the gas is delivered from a suitable source via tubing extending into the plenum and having at least one opening facing the bed through the support. The tubing and opening(s) are designed to deliver the decontaminating gas symmetrically and relatively uniformly across the bed, or predefined area of the bed, without degrading the force delivered by the gas.

The force created by a gas flow impinging on a surface, such as the bottom of the regenerative bed, is dependent on the mass flow and the velocity of the gas. The mass flow and velocity of gas flow required to deliver sufficient force to move a bed in the manner required is high and to apply such a flow of gas through the bed over an extended period of time would interfere with burner operation. It has been found, however, that the desired effect on the bed can be achieved by applying the high velocity flow of gas to the bed over a short period of time that is insufficient to interfere with burner operation. One method of creating the necessary force is to use a short, virtually instantaneous, pulse of air having a high velocity and mass flow. This type of gas flow can be produced by equipment of several kinds, but a so-called gas cannon or gas blaster is preferred. This type of equipment employs a relatively large reservoir which can be filled with a gas under considerable pressure. When desired, the gas can be released into tubing by rapid opening of a valve and the resultant flow or pulse of gas delivered by the tubing to the media bed. The flow of gas quickly falls to zero either when the reservoir is exhausted or when the valve is rapidly closed. A typical gas cannon suitable for the present invention has a reservoir of about 20 to 200 liters, filled with gas (preferably air) to a pressure of 90 to 95 pounds per square inch, which may be discharged in less than 1 second, preferably less than 0.1 second. The gas is typically delivered though tubing having diameters of from 2.5 to 6 inches. The force generated by such a rapid mass flow and velocity is between 1 and 6 kiloNewtons.

As an alternative to a gas cannon of the type described above, it is possible to use a piston and cylinder device including a motor for driving the piston virtually instantaneously through the cylinder, thereby driving air out of the cylinder in the form of a pulse.

The tubing and opening(s) used for delivering the gas pulse to the media bed preferably has a design that avoids any pressure differential that would significantly attenuate or spread out the pulse and reduce the peak mass flow and velocity, as well as ensuring uniform delivery of the gas. A preferred design is one that employs "wide open" outlet tubing and outlets that present uniform cross-sectional areas to the impinging gas pulse. That is to say, when tubing having only one opening is provided, the tubing has an opening preferably with a cross-sectional area at least as large as that of the tubing leading up to the opening. If two or more openings are provided along the length of the tubing, baffles are preferably provided within the tubing adjacent to each outlet. The baffles are designed to deflect some of the gas to the associated outlet without diminishing the rate of flow of the remaining gas and its delivery to the remaining outlet(s). Such arrangements may be referred to as "low-pressure-loss" distributors.

It should be noted that it is possible to use a single gas pulse source with a "lo-pressure-loss" distributor to supply gas to one or more outlets for a single bed, or to use multiple gas pulse sources and distributors for a single bed, with each distributor applying the pulse to a different bed section either at the same time or in predefined sequence. It is also possible to use a single gas pulse source to feed two or more distributor systems in sequence by using appropriate valving, provided that the valving is also of the low-pressure-loss type.

The gas flow from the openings provided is believed to be highly directional, forming a stream of gas directed by the orientation of the end of the tubes and mainly confined to the same cross-sectional area as the openings provided at the ends of the tubes. When such a stream of gas impinges on the bottom or side of a bed, the force of the gas stream is transferred to the initial layer of the bed material (usually spheres) that are "in-line" with the gas stream. The bed material then transfers this force to bed material that is in contact with the initial layer, and by that means the force is quickly spread and made uniform across a larger area of the bed. If the force is sufficient, the bed media can be made to "bounce" (i.e. move up and then down quite rapidly), which has the effect of vigorously shaking any contaminants from the bed media and breaking up any clumps or aggregations of contaminants. It is therefore preferable that the openings used to deliver the gas to the bed be distributed symmetrically beneath the area of the bed to be moved. The distance from the openings to the bottom of the bed can, in the case of tubes that are set at an angle from the vertical, be used to adjust this distribution as well.

The present invention may be used with regenerative bed systems and furnaces of all kinds. The regenerative beds may be made up, for example, of refractory ceramic spheres or particles of similar shapes arranged in a layer from 4 to 16 inches in thickness (more preferably 12 to 14 inches in thickness). The area of the bed can vary considerably, but a typical bed may have an approximate area of 2500 to 2700 square inches.

The decontaminating pulse of the present invention may be applied at any stage of the furnace operation. For example, the pulse may be applied while cool combustion gas is passing through the bed, or alternatively while hot waste gas is passing through the bed. The bed may be arranged, for example, so that combustion gas passes upwardly through the bed and waste gas passes downwardly, or vice versa. The decontaminating pulse in one form of the invention is applied as combustion gas is passing through the bed so that dislodged contaminants are swept through the bed and into the furnace where they are trapped within the charge of material being heated.

The decontamination step is preferably carried out fairly frequently. For example, it may be operated once per burner cycle or once every two burner cycles. This means, in a typical installation, that a gas pulse of 50 liters or so of gas at 95 psi (original pressure) is passed through the bed every three minutes. The gas pulse could be used more frequently (e.g. several times per burner cycle), but this could introduce significant amounts of gas into the combustion gas for the burner and affect its performance.

The present invention, at least in exemplary forms, makes it possible to maintain an effective flow of combustion and/or waste gas through a regenerative media bed for a longer period of time than would otherwise be the case. A regenerative media bed is conventionally replaced when the contamination reaches a point where the gas flow through the bed is either reduced to an unacceptable level, or when the gas passes through the bed by channeling (i.e. bypassing significant parts of the bed). Using the present invention, the time between bed replacements can be significantly increased, sometimes by as much as 14 to 21 fold.

While the present invention has been described in connection with a regenerative burner device intended for use with a melting furnace for metal, glass or the like, it may also be used for decontaminating media beds used with other kinds of apparatus, in those cases where the media beds become partially or completely blocked with contaminants over a period of time.

BRIEF DESCRIPTION OF THE DRAWINGS

FIG. 3b is a side view of the pulse divider of FIG. 3a; and

DETAILED DESCRIPTION OF THE INVENTION

Figure 1:
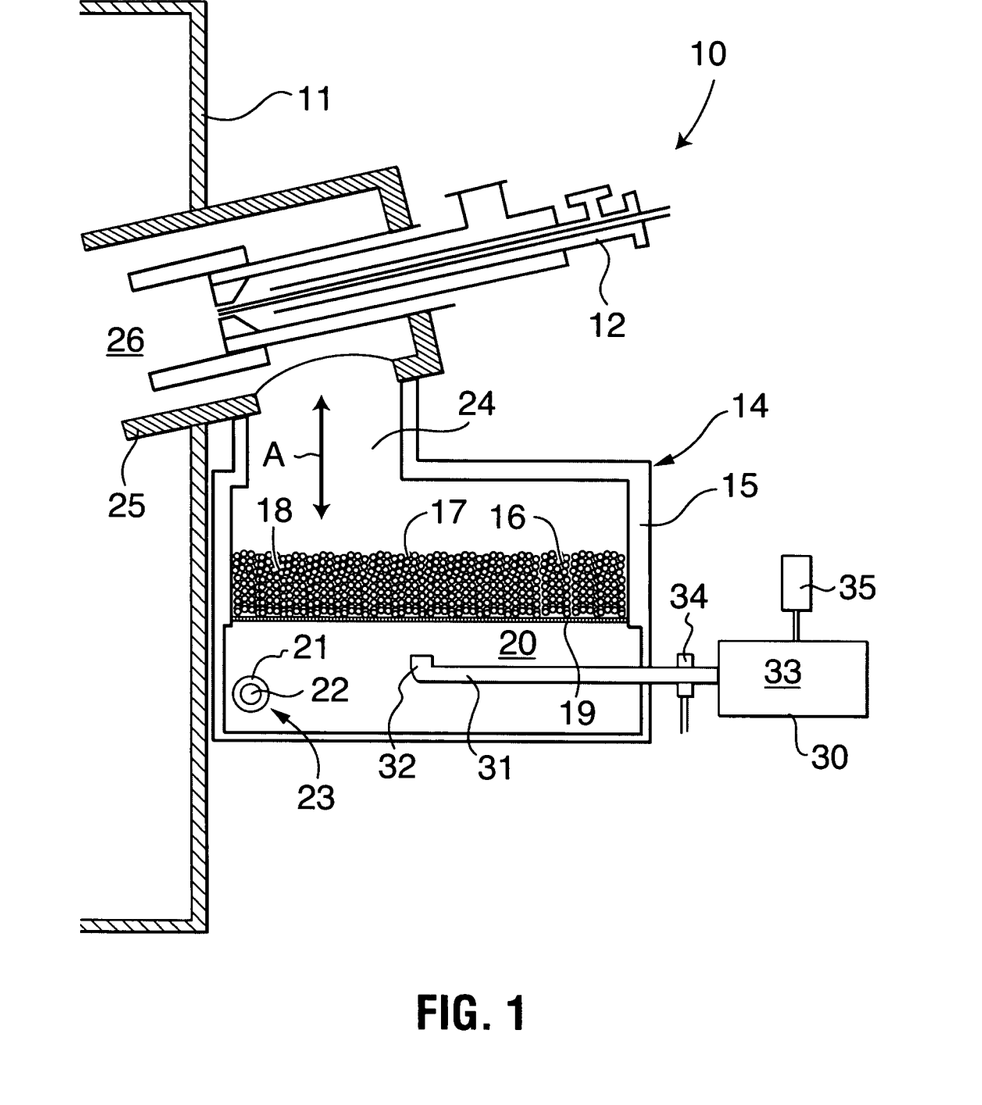
FIG. 1 is a simplified vertical cross-section of a regenerative burner device incorporating a media bed apparatus according to one preferred form of the present invention.

A regenerative burner device 10 according to one preferred embodiment of the present invention is shown in FIG. 1. This device is attached to the outside wall of a furnace 11 (shown only in part) and has a fuel burner 12 directed into the furnace and an associated media bed apparatus 14 containing a media bed 16 located within an enclosed housing 15. The media bed 16 is made up of several layers of refractory media particles 17, which are normally ceramic balls 18 capable of withstanding high temperature and having a good heat capacity and little tendency to react chemically with the gases that pass through the bed. The bed is porous due to gaps existing between the ceramic balls and allows for free passage of gases while ensuring good contact between the gases and the surfaces of the ceramic balls.

The media bed 16 is supported on a generally horizontal porous plate 19 above a free space or plenum 20. The plenum has a gas inlet 21 and a gas outlet 22 combined in a co-axial arrangement 23. In other arrangements separate gas inlets and outlets may be used, or a single pipe may be provided with valves to admit or exhaust the gas outside the plenum.

The burner device 10 as shown (referred to hereinafter as the first burner device) is used in tandem with an identical or other similar burner device provided for the same furnace 11 (the identical or similar burner device is not specifically shown, but is referred to hereinafter as the second burner device). During operation of the furnace, the burner 12 of the first burner device 10 is ignited and burned for a predetermined period of time. Combustion gas (air) required to support the combustion of fuel by the burner enters the plenum 20 through gas inlet 21 and is drawn upwardly through the media bed 16, and then through ducting 24 to a housing 25 surrounding the burner 12. Following a prior cycle, the media particles of the bed 16 are hot and the combustion gas is heated before it mixes with the fuel at the outlet 26 of the burner. The resulting flame generates heat for the furnace 11 and hot waste combustion gas that is directed into the interior of the furnace. Because of the prior heating of the combustion air by the media bed, less fuel is required to achieve a desired heating effect within the furnace. The hot waste gas is eventually exhausted from the furnace through the second burner device (not shown), which is not at this point ignited. Using the structure of the illustrated first combustion device 10 for comparison, the waste gas is routed through the outlet 26 of the burner of the second combustion device and then downwardly through the ducting 24 and through the media bed 16 causing heating of the media particles of that bed. After entry into the plenum 20, the waste gas (now considerably cooler) passes out of the device through the gas outlet 22. From this point on, the waste gas is preferably routed to auxiliary pollution control equipment (not shown), or simply discharged directly to the atmosphere.

During the operation of the second burner device 10 as explained above, a small amount of contaminant from the furnace is entrained within the waste gas and is condensed or deposited in the media bed of the second burner device. The identity of the contaminant depends on the nature of the material being heated in the furnace 11, and while gaseous, solid or liquid when contained in the stream of waste gas, it is solid or liquid when deposited in the media bed 16.

After a period of time, the first burner is extinguished and the second burner (not shown) is ignited. When this occurs, combustion gas from the furnace enters the first burner device 10 and heats the media bed 16 of that device in the manner already described. Again, a deposit of contaminant occurs within the bed. At the same time, the media bed of the second burner device contacts and pre-heats the combustion gas supplied to the burner of that device. This cycle of operation (successive use of one burner and then the other) is repeated for the duration of the heating period required for the furnace, so (for each burner device), cool combustion gas flows through the housing 15 and media bed 16 in one direction (preferably upwardly) during one combustion cycle, and then hot waste gas flows through the housing in the opposite direction in the next combustion cycle, as indicated by the double-ended arrow A shown in FIG. 1.

The deposits of contaminant eventually reduce the porosity of the media bed 16 and thus reduce the desired gas flow through the bed. This reduces the efficiency of the apparatus and can result in complete blockage in extreme cases. Normally, the housing 15 would be provided with one or more access doors to permit periodic maintenance and cleaning of the media bed 16. Such doors should still preferably be provided in the burner device of the present invention, although they are not shown in FIG. 1, as it will still eventually be necessary to clean or replace the media bed. However, the burner device of the present invention is also provided with means for periodic decontamination of the media bed by delivering a rapid flow (pulse) of a decontaminating gas into the media bed with sufficient force to cause dislodgement of contaminants collected in the bed.

In the embodiment of FIG. 1, the means for delivery of the rapid flow of decontaminating gas includes a gas cannon 3 (sometimes referred to as a gas blaster) connected to delivery tubing 31 extending into the plenum 20 and having a single outlet 32 facing the underside of the porous supporting plate 19 of the media bed 16. The gas cannon has a reservoir 33 filled with air (or other gas) under high pressure (e.g. 85 to 95 psi) that is released virtually instantaneously into the delivery tubing 31 upon opening of a solenoid-operated on/off valve 34. The opening of the valve 34 provides a flow of gas in the form of a pulse, i.e., a rapid wave of gas at a pressure that rises from zero to a high level and then, after a short period of time, falls quickly back to zero. In such a case, the pulse has a generally square profile (when viewed as a pressure versus time plot). The gas cannon 30 has an associated air pump 35 (driven by electricity or other means) that recharges the reservoir with gas to the required pressure after the valve 34 has re-closed. Suitable gas cannons can be obtained, for example, from Global Manufacturing, Inc. of Little Rock, Ark. (e.g. Model G400-40-50 operated at 90 psi, or Model G400-40-150 operated at 60 to 90 psi).

The outlet 32 of the delivery tube 31 is preferably oriented at right angles to the axis of the delivery tube (as shown), thereby directly facing the underside of the supporting plate 19 at a certain distance. This distance is preferably more than 5 inches. The maximum spacing is typically controlled by the size of the plenum, in turn controlled by the overall burner-furnace configuration. It would be typically less than 15 inches. As the gas flow is directional, spacing within this range will deliver the pulse of air into the media bed without substantially diminished force. The supporting plate 19 itself should also preferably have a fairly open design. That is to say, it is usually better to use an expanded metal plate (a plate provided with elongated cuts in closely spaced transverse rows that is then stretched to open the cuts into enlarged holes), rather than a solid plate drilled with small holes. Of course, the holes in the plate must be small enough to prevent loss of the media particles, but should be large enough to avoid substantial attenuation of the gas pulse before it enters the media bed.

It may be preferable to provide more than one outlet 32 and/or more than one delivery tube 31 in order to deliver the pulse to a larger area of the media bed or to allow parts of the bed to be treated at different times.

Figure 2:
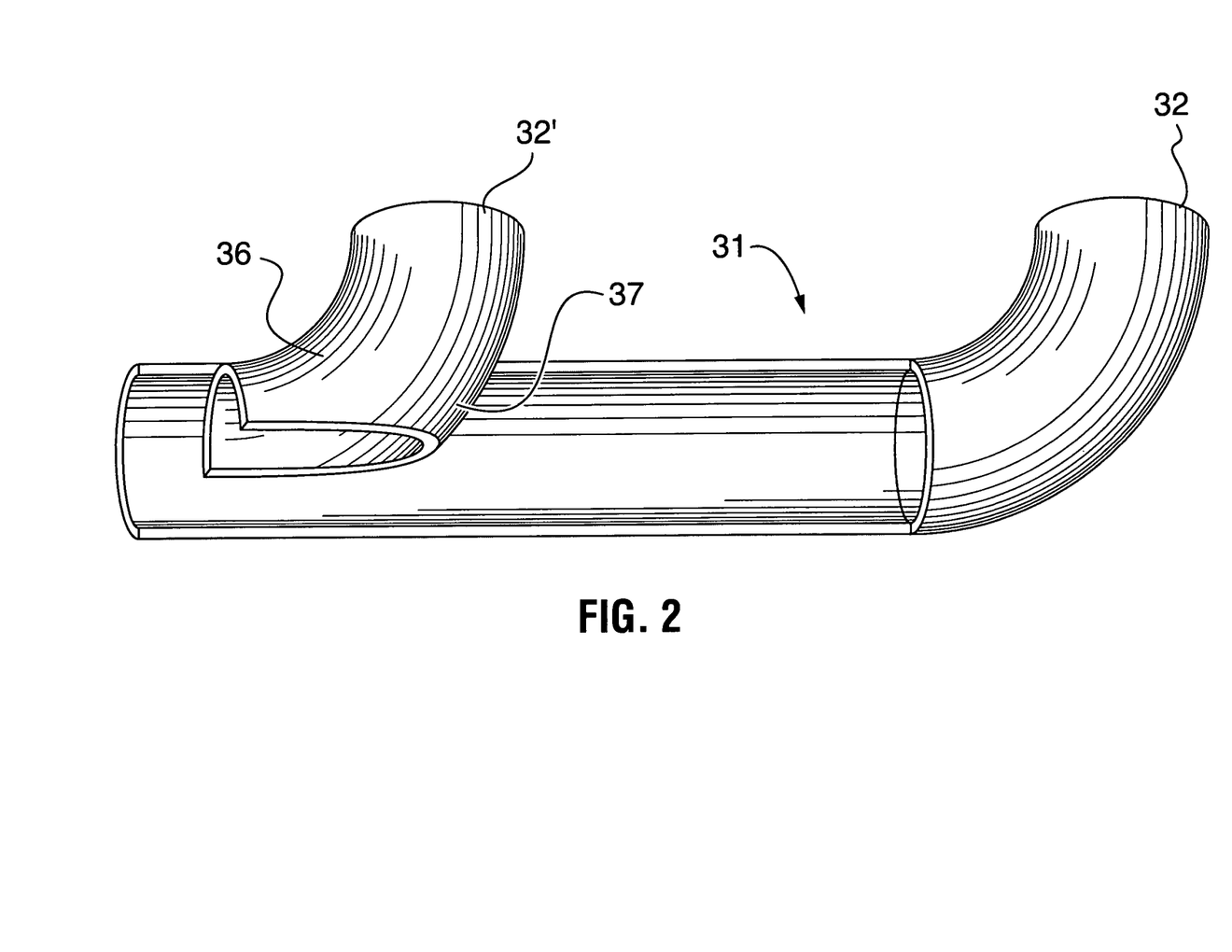
FIG. 2 is a perspective view, partly in section, of one end of gas pulse delivery tubing of an alternative embodiment of the invention.

FIG. 2 shows one end of a delivery tube 31, i.e. the end that delivers the gas pulse to the media bed. The tube is provided with two outlets, i.e. an end outlet 32 and an intermediate outlet 32', each oriented at 90 degrees to the longitudinal axis of the tube. It can be seen that the intermediate outlet 32' has a part 36 extending into the interior of the tube 31. This part forms a baffle 37 that blocks approximately 50% of the cross-sectional area of the tube interior and diverts approximately the same percentage of the gas pulse into the intermediate outlet 32'. The remainder of the cross-sectional area of the tube below the baffle remains open for passage of the remainder of the gas pulse for delivery through the end outlet 32. Similarly, more outlets could be provided along the length of the tube, each having a baffle similar to 37 that diverts an appropriate percentage of the gas pulse into its associated outlet so that gas pulses of approximately equal force and volume are delivered from each outlet.

Figure 3A:
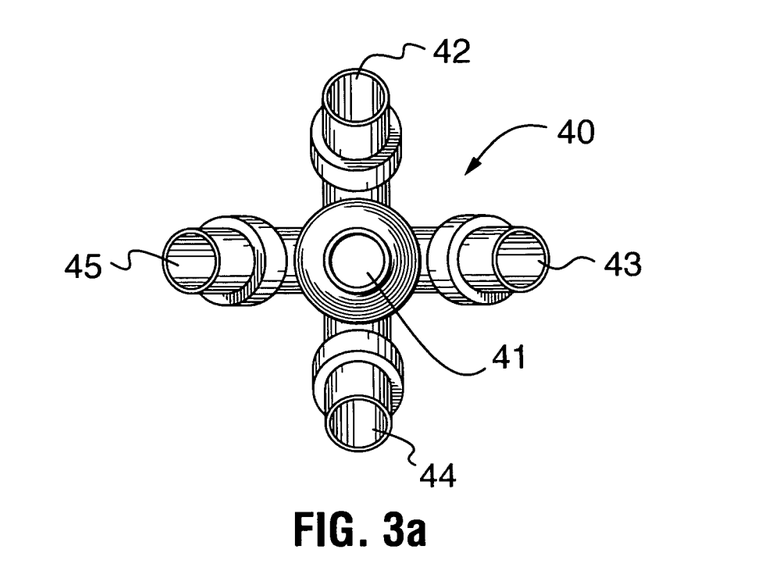
FIG. 3a is a top plan view of a pulse divider used in another embodiment of the invention.
Figure 3B:
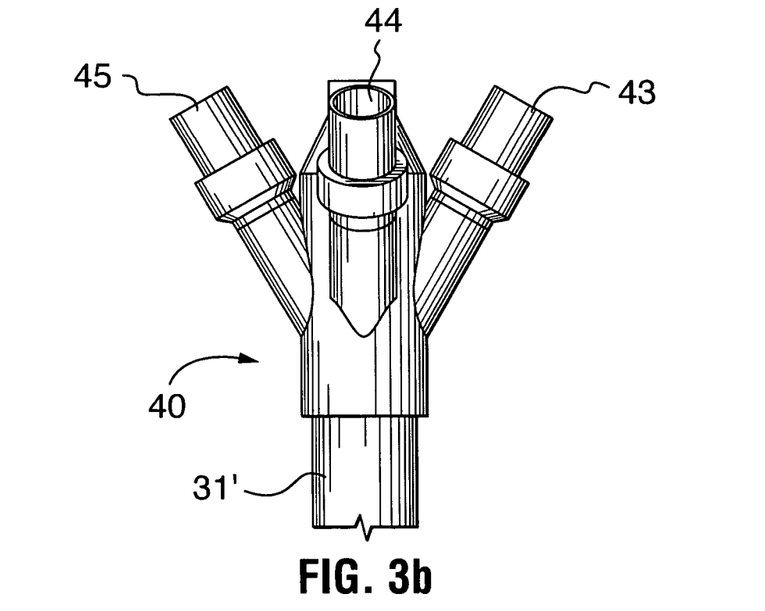

FIGS. 3a and 3b show a pulse divider 40 that may be used to feed a single gas pulse into several (in this case five) delivery tubes, each provided with a single or multiple outlets (not shown). The pulse divider 40 has a main tube 31' for receiving a gas pulse from a gas cannon (not shown) of the type previously disclosed, a central branch 41 aligned with the main tube 31', and four branch tubes 42, 43, 44 and 45 that extend from the main tube at approximately 135 degrees to the longitudinal axis of the main tube. The branch tubes are arranged at equal spacing around the periphery of the main tube, i.e. at 90 degrees to each other. The diameters of the branch tubes are the same and each is smaller than that of the main tube as less gas volume has to be conveyed through each branch tube due to the approximate quartering of the gas flow at the point of division. The openings at the ends of each tube are substantially the same as the tubing leading up to it so as to avoid any pressure drops.

Figure 4:
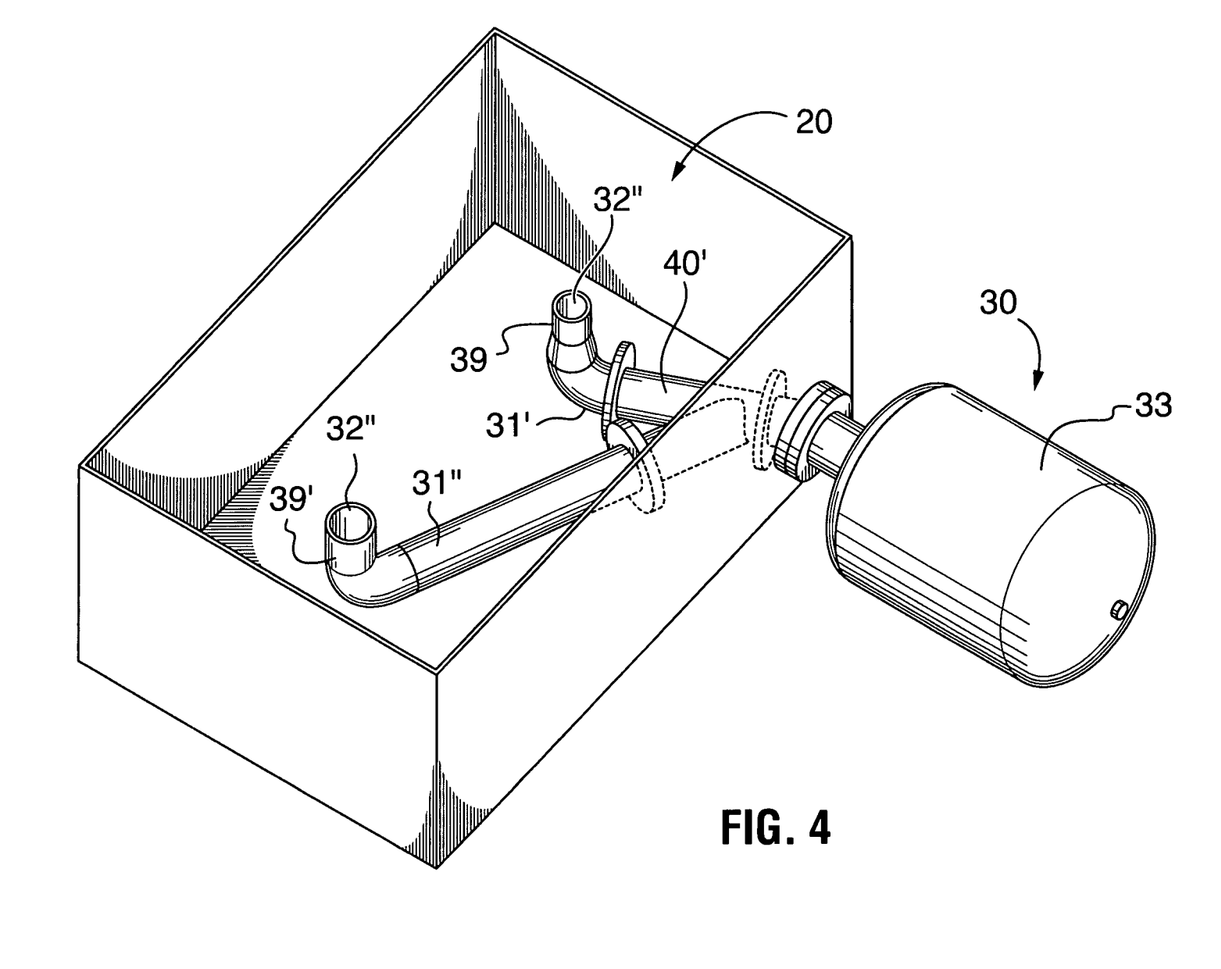
FIG. 4 is a perspective view showing a gas blaster with a gas pulse delivery tubing used in yet another embodiment of the invention.

FIG. 4 shows a further type of apparatus (illustrating just the gas cannon 30, tubing and plenum 20) in which a pulse divider 40' used to divide the tubing into two delivery tubes 31', 31" of different length. The end portion 39 of the short tube 31' is of smaller diameter (3 inches) than the end portion 39' of the longer tube 31" (4 inches) to balance and equalize the flow through both tubes. The end openings 32" and 32'" of the two tubes are the same diameter as the tubing leading up to the respective outlets to avoid any added pressure drops upstream of the outlets.

EXAMPLE

A system according to the present invention was tested in a regenerative burner system having a bed consisting of ¾ inch alumina spheres. The bed depth was 12 to 13 inches and the area was 2520 square inches. A single delivery tube with two outlets as illustrated in FIG. 4 was used to deliver a pulse of gas every 3 minutes from a reservoir 33 having a volume of 50 liters and charged to a pressure of 95 psi. Using such a system, the time between bed replacements was increased by a factor of 22.

What we claim is:

1. A regenerative burner device for a furnace, comprising:
a burner for periodically introducing heat and waste gas into a furnace during ignition when supplied with fuel and a combustion gas,
a media bed comprising refractory particles,
ducting for delivering combustion gas to said burner during said ignition, and for drawing waste gas from said furnace on termination of said ignition, said ducting causing said combustion gas and said waste gas to pass in succession through said media bed;
a source of decontaminating gas under pressure; and
delivery tubing having a stationary outlet positioned adjacent the media bed for delivering a decontaminating gas pulse to the media bed in less than one second, wherein the decontaminating gas pulse is of sufficient force to cause the refractory particles to bounce and thereby to dislodge contaminants collected in the media bed from the waste gas.

2. The device of claim 1, further comprising a valve for releasing the decontaminating gas pulse from the source of decontaminating gas under pressure through the delivery tubing.

3. The device of claim 2, wherein said media bed is supported on a porous support above a plenum, and wherein the stationary outlet is positioned in said plenum facing said porous support.

4. The device of claim 2, wherein the source of decontaminating gas under pressure is a reservoir holding said decontaminating gas under pressure, and the valve is an on/off valve capable of venting said reservoir substantially instantaneously.

5. The device of claim 1, wherein the delivery tubing and the stationary outlet present uniform cross-sectional areas to the decontaminating gas pulse to avoid creation of a pressure differential as the decontaminating gas pulse is delivered through said outlet.

6. The device of claim 1, wherein the delivery tubing additionally includes a second stationary outlet, wherein the stationary outlet is positioned at an end of the delivery tubing remote from the source of decontaminating gas under pressure, and wherein the second stationary outlet is positioned between the stationary outlet and the source of decontaminating gas under pressure.

7. The device of claim 6, wherein the second stationary outlet has an associated baffle within the delivery tubing for deflecting part of the decontaminating gas pulse to the secondary outlet, while allowing another part of the decontaminating gas pulse to flow to the stationary outlet, wherein the baffle and cross-sectional areas of the stationary outlet and the second stationary outlet being arranged to deliver substantially equal volumes of decontaminating gas through each of the stationary outlet and the second stationary outlet.

8. The device of claim 1, wherein the delivery tubing includes a main part adjacent to the source of decontaminating gas under pressure, a first branch, and a second branch, wherein the stationary outlet is positioned on the first branch, wherein a second stationary outlet is positioned on the second branch, and wherein the second stationary outlet is positioned adjacent the media bed.

9. The device of claim 8, wherein the stationary outlet and the second stationary outlet are positioned to each deliver the decontaminating gas pulse to different parts of the media bed simultaneously.

10. A media bed apparatus for a regenerative burner of a furnace, comprising:
a media bed comprising refractory particles, ducting for passing waste gas and combustion gas in succession through said bed from a furnace and to a burner;
a source of decontaminating gas under pressure; and
delivery tubing having a stationary outlet positioned adjacent the media bed for delivering a pulse of the decontaminating gas to the media bed in less than one second, wherein the pulse of the decontaminating gas is of sufficient force to cause the refractory particles to bounce and thereby to dislodge contaminants collected in the media bed from the waste gas.

11. The apparatus of claim 10, wherein the refractory particles are supported on a gas-permeable support and the stationary outlet is positioned to deliver the pulse of decontaminating gas through the gas-permeable support.

12. The apparatus of claim 10, wherein the delivery tubing includes a second stationary outlet positioned adjacent to the media bed.

13. The apparatus of claim 10, wherein the stationary outlet has a cross-sectional area substantially the same as that of the delivery tubing.

14. A method comprising:
discharging a pulse of a gas to a media bed of a regenerative burner for a furnace, the media bed containing refractory particles, wherein discharging the pulse occurs while combustion gas supplied to the regenerative burner or waste gas removed from the furnace is passing through the media bed, wherein the pulse is discharged in less than one second, and wherein the pulse of gas is discharged from a stationary outlet; and
bouncing the refractory particles to dislodge contaminants collected in the media bed from the waste gas in response to discharging the pulse of the gas, wherein the pulse of gas is of sufficient force to cause the refractory particles to bounce.

15. The method of claim 14, wherein the pulse of gas applied to the media bed delivers a force of between 1 and 6 kiloNewtons.

16. A decontamination device for a media bed of a regenerative burner for a furnace, the media bed comprising refractory particles, the device comprising a source of gas under pressure and tubing having at least one stationary outlet for delivering a pulse of gas in less than one second, wherein the tubing and the at least one stationary outlet present uniform cross-sectional areas to the pulse of gas to avoid creation of a pressure differential as the pulse of gas is delivered through the tubing and out the at least one stationary outlet, and wherein the pulse of gas is of sufficient force to cause the refractory particles to bounce while combustion gas supplied to the burner or exhaust gas removed from the furnace is passing through the media bed and thereby to dislodge contaminants collected in the media bed as a result of operation of the regenerative burner.

17. The device of claim 16, wherein the source of gas under pressure is a gas cannon.

* * * * *